US012552726B2

(12) United States Patent
Jacobson et al.

(10) Patent No.: US 12,552,726 B2
(45) Date of Patent: Feb. 17, 2026

(54) INCORPORATION OF BIOLOGICAL AGENTS IN FERTILIZERS

(71) Applicant: The Mosaic Company, Plymouth, MN (US)

(72) Inventors: Kathlene Laurie Jacobson, Saskatoon (CA); Troy William Hobbs, Plymouth, MN (US); Lauren A. Balaban, Wimauma, FL (US)

(73) Assignee: The Mosaic Company, Tampa, FL (US)

( * ) Notice: Subject to any disclaimer, the term of this patent is extended or adjusted under 35 U.S.C. 154(b) by 162 days.

(21) Appl. No.: 17/674,754

(22) Filed: Feb. 17, 2022

(65) Prior Publication Data

US 2022/0274896 A1 Sep. 1, 2022

Related U.S. Application Data

(63) Continuation of application No. 15/324,473, filed as application No. PCT/US2015/039302 on Jul. 7, 2015, now abandoned.

(Continued)

(51) Int. Cl.
*C05F 11/08* (2006.01)
*C05B 17/00* (2006.01)
(Continued)

(52) U.S. Cl.
CPC .............. *C05F 11/08* (2013.01); *C05B 17/00* (2013.01); *C05D 1/005* (2013.01); *C05F 11/10* (2013.01); *C05G 5/12* (2020.02); *C05G 5/30* (2020.02)

(58) Field of Classification Search
CPC .... C05G 3/0041; C05G 3/0058; C05D 1/005; C05B 17/00; C05F 11/08; C05F 11/10
See application file for complete search history.

(56) References Cited

U.S. PATENT DOCUMENTS 2,739,886 A 3/1956 Henry et al.
3,304,249 A 2/1967 Herbert et al.
(Continued)

FOREIGN PATENT DOCUMENTS

AU 554749 B1 9/1986
AU 754223 B2 11/2002
(Continued)

OTHER PUBLICATIONS

Anna N., "Potash Processing: Pelletizing vs. Compaction Granulation," FEECO International, Retrieved from the Internet: http://feeco.com:80/2014/01/02/potash-processing-pelletizing-compaction-granulation/ on Jan. 2, 2014, 4 pages.
(Continued)

*Primary Examiner* — Jennifer A Smith
(74) *Attorney, Agent, or Firm* — Husch Blackwell LLP

(57) ABSTRACT

A biological-laden dry fertilizer includes a dry fertilizer granule and a coating inoculated with a biological agent and applied to the dry fertilizer granule. The biological coating is a solution or suspension comprising water or oil and at least one biological agent, or an emulsion of an oil and a solution or suspension comprising water and at least one biological agent. The at least one biological agent is a biological chemical, plant extract, microbial agent, and/or a living organism.

16 Claims, 6 Drawing Sheets

Related U.S. Application Data

(60) Provisional application No. 62/021,552, filed on Jul. 7, 2014.

(51) Int. Cl.
*C05D 1/00* (2006.01)
*C05F 11/10* (2006.01)
*C05G 5/12* (2020.01)
*C05G 5/30* (2020.01)

(56) References Cited

U.S. PATENT DOCUMENTS

| | | | |
|---|---|---|---|
| 3,560,192 | A | 2/1971 | Cicco et al. |
| 3,708,275 | A | 1/1973 | Camp, Jr. |
| 3,734,707 | A | 5/1973 | Seymour |
| 3,854,923 | A | 12/1974 | Ott |
| 3,953,192 | A | 4/1976 | Hodgson et al. |
| 4,319,910 | A | 3/1982 | Meyer |
| 4,507,142 | A | 3/1985 | Pace et al. |
| 4,581,056 | A | 4/1986 | Nooden et al. |
| 4,581,057 | A | 4/1986 | Nooden |
| 5,292,507 | A | 3/1994 | Charley |
| 5,328,497 | A | 7/1994 | Hazlett |
| 5,360,465 | A | 11/1994 | Buchholz et al. |
| 5,366,532 | A | 11/1994 | Fages et al. |
| 5,383,952 | A | 1/1995 | Singewald et al. |
| 5,433,766 | A | 7/1995 | Ming et al. |
| 5,451,242 | A | 9/1995 | Ming et al. |
| 5,849,060 | A | 12/1998 | Diping et al. |
| 5,851,260 | A | 12/1998 | Aijala et al. |
| 5,968,222 | A | 10/1999 | Kodali |
| 6,311,426 | B1 | 11/2001 | Mehta et al. |
| 6,322,607 | B1 | 11/2001 | Brown et al. |
| 6,331,300 | B1 | 12/2001 | Dybas et al. |
| 6,346,131 | B1 | 2/2002 | Bergevin |
| 6,491,736 | B1 | 12/2002 | Bell et al. |
| 6,544,313 | B2 | 4/2003 | Peacock et al. |
| 6,797,277 | B2 | 9/2004 | Heier et al. |
| 7,297,314 | B2 | 11/2007 | Natsuyama et al. |
| 7,410,522 | B2 | 8/2008 | Green |
| 7,445,657 | B2 | 11/2008 | Green |
| 7,497,891 | B2 | 3/2009 | Peacock |
| 7,691,169 | B2 | 4/2010 | McCoy, Jr. |
| 8,110,017 | B2 | 2/2012 | Wells |
| 8,221,515 | B2 | 7/2012 | Goodwin |
| 8,497,229 | B2 | 7/2013 | Van Boxtel-Verhoeven et al. |
| 8,506,670 | B2 | 8/2013 | Varadachari |
| 8,557,013 | B2 | 10/2013 | Burnham et al. |
| 9,199,883 | B2 | 12/2015 | Peacock et al. |
| 2002/0098982 | A1 | 7/2002 | Burnham |
| 2005/0020449 | A1 | 1/2005 | Blais |
| 2006/0081028 | A1 | 4/2006 | Hammons |
| 2007/0131009 | A1 | 6/2007 | Westbrook et al. |
| 2010/0170314 | A1 | 7/2010 | Goodwin |
| 2011/0000268 | A1 | 1/2011 | Schaafsma et al. |
| 2011/0077155 | A1 | 3/2011 | Goodwin |
| 2011/0154874 | A1 | 6/2011 | Rahn et al. |
| 2011/0214465 | A1 | 9/2011 | Peacock et al. |
| 2012/0073341 | A1 | 3/2012 | Goodwin |
| 2012/0083412 | A1 | 4/2012 | Trevino et al. |
| 2012/0090367 | A1 | 4/2012 | Wright et al. |
| 2012/0128981 | A1 | 5/2012 | Iyer |
| 2014/0352376 | A1 | 12/2014 | Carpenter |
| 2015/0141244 | A1 | 5/2015 | Hellwege et al. |
| 2015/0141245 | A1 | 5/2015 | Wachendorff-Neumann et al. |
| 2015/0141246 | A1 | 5/2015 | Hellwege et al. |
| 2015/0148228 | A1 | 5/2015 | Wachendorff-Neumann et al. |
| 2015/0210603 | A1 | 7/2015 | Du et al. |
| 2015/0251962 | A1 | 9/2015 | Peacock et al. |
| 2015/0376076 | A1 | 12/2015 | Ward et al. |
| 2016/0083308 | A1 | 3/2016 | Peacock et al. |
| 2016/0200637 | A1 | 7/2016 | Jacobson et al. |
| 2017/0044078 | A1 | 2/2017 | McLaughlin et al. |
| 2017/0057881 | A1 | 3/2017 | Goodwin et al. |
| 2017/0066693 | A1 | 3/2017 | Ledoux |
| 2017/0197890 | A1 | 7/2017 | Jacobson et al. |

FOREIGN PATENT DOCUMENTS

| | | |
|---|---|---|
| AU | 2015288096 A1 | 2/2017 |
| CA | 2021248 | 4/2000 |
| CN | 101815635 A | 8/2010 |
| CN | 101885635 A | 11/2010 |
| CN | 102652111 A | 8/2012 |
| CN | 102781880 A | 11/2012 |
| CN | 101993285 B | 6/2013 |
| EP | 0081008 | 6/1983 |
| EP | 0470287 A1 | 2/1992 |
| EP | 3166911 A1 | 5/2017 |
| GB | 2023109 A | 12/1979 |
| JP | S49105800 A | 10/1974 |
| JP | S61125631 A | 6/1986 |
| JP | S63112484 A | 5/1988 |
| JP | H02275792 A | 11/1990 |
| JP | H07109192 A | 4/1995 |
| JP | H11209190 A | 8/1999 |
| JP | 2000044376 A | 2/2000 |
| JP | 2000143378 A | 5/2000 |
| JP | 2003192483 A | 7/2003 |
| KR | 19990034842 A | 5/1999 |
| KR | 19990046371 A | 7/1999 |
| KR | 20020060680 A | 7/2002 |
| KR | 100399401 B1 | 9/2003 |
| RU | 2125549 C1 | 1/1999 |
| UA | 73120 C2 | 6/2005 |
| WO | WO-9506623 A1 | 3/1995 |
| WO | WO-9508521 A1 | 3/1995 |
| WO | WO-9915480 A1 | 4/1999 |
| WO | WO-9915482 A1 | 4/1999 |
| WO | WO-0064837 A1 | 11/2000 |
| WO | 2003/034829 | 5/2003 |
| WO | WO-2008000492 A2 | 1/2008 |
| WO | 2011/036413 | 3/2011 |
| WO | WO-2011073017 A1 | 6/2011 |
| WO | WO-2011080764 A1 | 7/2011 |
| WO | WO-2011082301 A2 | 7/2011 |
| WO | WO-2011082301 A3 | 11/2011 |
| WO | WO-2012172558 A1 | 12/2012 |
| WO | 2013/109153 | 7/2013 |
| WO | WO-2014036572 A2 | 3/2014 |
| WO | WO-2014080352 A1 * | 5/2014 ............. A01N 37/36 |
| WO | WO-2014193946 A1 | 12/2014 |
| WO | WO-2015026806 A1 | 2/2015 |
| WO | WO-2016007460 A1 | 1/2016 |

OTHER PUBLICATIONS

Application and File history for U.S. Appl. No. 14/913,091, filed Feb. 19, 2016. Inventors: Jacobson et al.

Application and File history for U.S. Appl. No. 15/235,499, filed Aug. 12, 2016, Inventors: McLaughlin et al.

"Database WPI," Week 201127, Thomson Scientific, London, GB, AN 2010-Q3017, 11 pages.

"Foreign Industrial Technology," Edited by Foreign Industrial Technology Editors, Shanghai Science and Technology Literature Publishing House, Mar. 31, 1982, 1 page.

IKA designed to work perfectly, "Emulsifying", Retrieved from the Internet: URL: https://www.ikaprocess.com/en/Emulsifying-appl-7.html; on Nov. 22, 2019, pp. 1-2.

International Preliminary Report on Patentability for PCT Application No. PCT/US2015/039302, mailed Jan. 19, 2017, 10 pages.

International Preliminary Report on Patentability for PCT Application No. PCT/US2016/046717 mailed Feb. 22, 2018, 13 pages.

International Search Report and Written Opinion for PCT Application No. PCT/US2014/051662 mailed on Nov. 11, 2014, 16 pages.

International Search Report and Written Opinion for PCT Application No. PCT/US2016/046717, mailed Nov. 21, 2016, 17 pages.

International Search Report for PCT Application No. PCT/US2015/039302, dated Aug. 28, 2015, 4 pages.

(56) References Cited

OTHER PUBLICATIONS

Ivell D.M., et al., "The Evolution of Screening Systems for Optimum Granular Fertilizer Product Quality," Procedia Engineering 83, Retrieved from https://www.sciencedirect.com/science/article/pii/S1877705814011175, Jan. 1, 2014, pp. 328-335.

Jing-An X., "New Process and Applied Technology for Production of Compound Fertilizers and Functional Fertilizers", Beijing, Chemical Industry Press, Sep. 30, 2000, 3 pages.

Vashistha M., et al., "Improvement in properties of urea by phosphogypsum coating," International Journal of ChemTech Research, Jan. 1, 2010, 10 pages.

Written Opinion for PCT Application No. PCT/US2015/039302 mailed on Aug. 28, 2015, 8 pages.

Xiang J.S., "Phosphoric Acid, Phosphate Fertilizer and Compound Fertilizer," Beijing, Chemical Industry Press, Mar. 31, 1999, 3 pages.

Extended European Search Report corresponding to EP 23190069.7 dated Mar. 7, 2024.

Kim et al., "Development of W /O/W Multiple Emulsion Formulation Containing Burkholderia gladioli", 2005.

Malusa et al.,"Technologies for beneficial microorganisms inocula used as biofertilizers", 2012.

Wiesenberger, "State-of-the-art for the production of fertilisers with regard to the IPPC-directive" published by the Federal Environment Agency of Austria in 2002.

Ayyash et al. "The effect of NaCl substitution with KCl on Akawi cheese: Chemical composition, proteolysis, angiotensin-converting enzyme-inhibitory activity, probiotic survival, texture profile, and sensory properties", 2012.

Schobert and Lanyi, J. Biol. Chem. "Halorhodopsin Is a Light-driven Chloride Pump". 1982.

Oren, "Life at high salt concentrations, intracellular KCl concentrations, and acidic proteomes", 2013.

Manish Vashishtha et al, "Improvement in properties of urea by phosphogypsum coating", International Journal of ChemTech Research, Jan. 1, 2010 , pp. 36-44.

https://www.ikaprocess.com/en/Emulsifying-appl-7.html, 2024.

Microfluidizer Processors vs High Pressure Homogenizers (microfluidics-mpt.com), 2017.

Scherer, H.W., et al, "Fertilizers in Ullmann's Encyclopaedia of Industrial Chemistry", 2006.

Notice of Opposition—Yara International ASA dated May 14, 2024.
Notice of Opposition—Strawman Limited dated May 15, 2024.
Notice of Opposition dated May 23, 2024.
Written Submissions dated Sep. 23, 2024 in response to Notice of Opposition.

\* cited by examiner

INCORPORATION OF BIOLOGICAL AGENTS IN FERTILIZERS

PRIORITY CLAIM

The present application is a continuation of U.S. application Ser. No. 15/324,473, filed Jan. 6, 2017, which is a national phase entry of PCT Application No. PCT/US2015/039302, filed Jul. 7, 2015, which claims the benefit of U.S. Provisional Application No. 62/021,552 filed Jul. 7, 2014, each of which is incorporated herein in its entirety by reference.

FIELD OF THE INVENTION

Embodiments of the present invention is directed to fertilizers and manufacture thereof, and more particularly incorporation of biological agents into fertilizers.

BACKGROUND OF THE INVENTION

Agricultural inorganic fertilizers typically include a base comprising at least one of three primary inorganic nutrients—nitrogen (N), phosphate (P), and potassium (K). These fertilizers are identified by their NPK rating in which the N value is the percentage of elemental nitrogen by weight in the fertilizer, and the P and K values represent the amount of oxide in the form of $P_2O_5$ and $K_2O$ that would be present in the fertilizer if all the elemental phosphorus and potassium were oxidized into these forms. The N—P—K proportions or concentration vary across fertilizer types and user needs.

For example, the base fertilizer can comprise a phosphate fertilizer (such as monoammonium phosphate ("MAP"), diammonium phosphate ("DAP"), a potash fertilizer (such as muriate of potash ("MOP")) or other potassium-based fertilizer, or a nitrogen-based fertilizer such as a fertilizer containing urea. The fertilizers can also include any combination of secondary nutrients and/or micronutrients. The secondary nutrients can include sulfur compounds, calcium, and/or magnesium, and the micronutrients can include iron, manganese, zinc, copper, boron, molybdenum, and/or chlorine. The micronutrients and/or secondary nutrients can be added to solution in their elemental form, or as compounds, such as a salt.

Stressed areas, such as those areas where soil conditions are highly saline, experience frequent drought or other stresses, often cannot support agriculture or have materially reduced yield levels. In these conditions, application of fertilizers alone may be insufficient to render the stressed area profitable. Much of the world is covered by such stressed areas, and therefore a solution to make these areas suitable for the profitable cultivation of crops is needed.

SUMMARY OF THE INVENTION

According to embodiments of the invention, biological-laden or -inoculated fertilizer granules includes a dry fertilizer granule, and particularly an N—P—K based fertilizer (in which each of N, P, and K range from 0 to 100% relative content of each element), and a biological coating containing one or more biological agents or compositions, or "biologicals", applied to the dry fertilizer granule. In some aspects, the biological agents or compositions, or "biologicals," can comprise, for example, one or more biological chemicals, plant and other extracts, microbial agents, and/or other organisms. In some embodiments, the biological agent can comprise microorganisms, including, but not limited to, one or more species from a bacterial genus such as, but not limited to, *Bacillus, Rhizobium, Azobacter*, and *Azospirillum*, one or more species from a fungal genus or fungi such as *Aspergillus, Mycorhizzae, Beauveria, Metarhizium*, and *Trichoderma*, and/or one or more species from a yeast genus such as *Saccharomyces, Schizosaccharomyces, Sporobolomyces, Candida, Trichosporon*, and *Rhodosporidium*. In other cases, the biological agent can comprise agents that are not microorganisms, including, but not limited to, small molecule and peptide-based compositions such as metabolites, peptides, lipopetides, hormones, peptide hormones, siderophores, glycopepetides, humates, surfactants, vitamins, enzymes, amino acids and amino acid derivatives, and/or nucleic acids and nucleic acid derivatives. Optionally, in addition to the biological agent, antimicrobial agents, pesticides, insecticides, fungicides, surfactants, emulsifiers, pigments, dyes, and/or other additives can be combined with the biological agent(s) in a biological composition.

In some embodiments, the biological coating is formed from a material or composition including an aqueous solution or dispersion and one or more biologicals dispersed throughout. In other embodiments, the biological coating material includes an oil-based carrier and one or more biologicals dispersed throughout. In yet other embodiments, the biological coating material contains a water-in-oil or an oil-in-water emulsion of an oil and a solution of water and one or more biologicals. In other words, the biologicals, and optional other additives, are dispersed in water to form a biological composition, and then the dispersion or solution is emulsified with oil, such that the biologicals are encapsulated by the water phase.

A biological-laden fertilizer can be made by a process including providing a plurality of granulated pellets comprising a fertilizer, mixing the plurality of granulated pellets, and spraying or otherwise coating the plurality of granulated pellets with such a biological-containing coating material.

The above summary of embodiments of the invention is not intended to describe each illustrated embodiment or every implementation of the present invention. The figures and the detailed description that follow more particularly exemplify these embodiments.

BRIEF DESCRIPTION OF THE DRAWINGS

Embodiments of the invention may be more completely understood in consideration of the following detailed description in connection with the accompanying drawings, in which:

FIG. 1-1 is a detailed view of section 1-1 of FIG. 1, according to an embodiment.

FIG. 1-2 is a detailed view of section 1-2 of FIG. 1, according to an embodiment.

FIG. 2 is a schematic illustration of a process for manufacturing a dry potash-based fertilizer, according to an embodiment.

Figure 1:
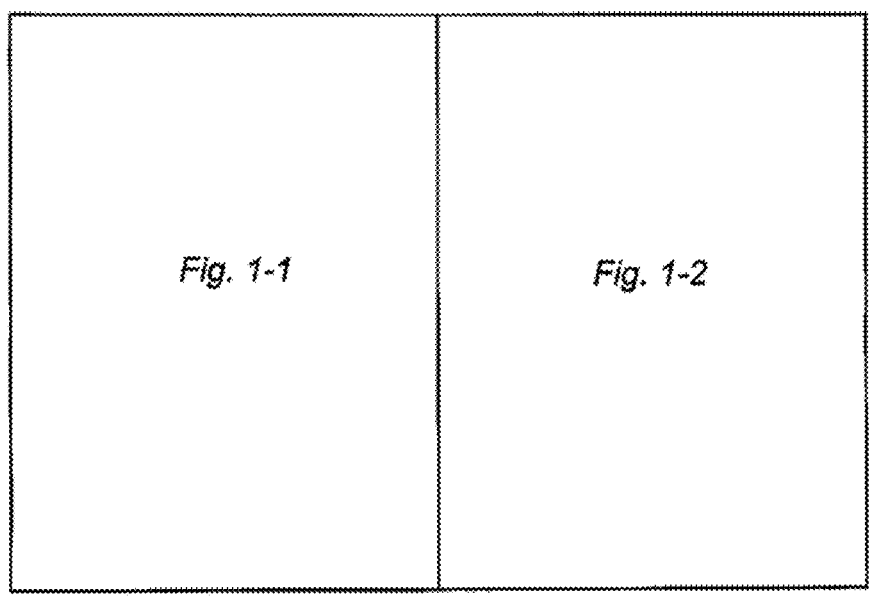
FIG. 1 is a schematic illustration of a process for manufacturing a dry phosphate-based fertilizer, according to an embodiment.
Figure 1:
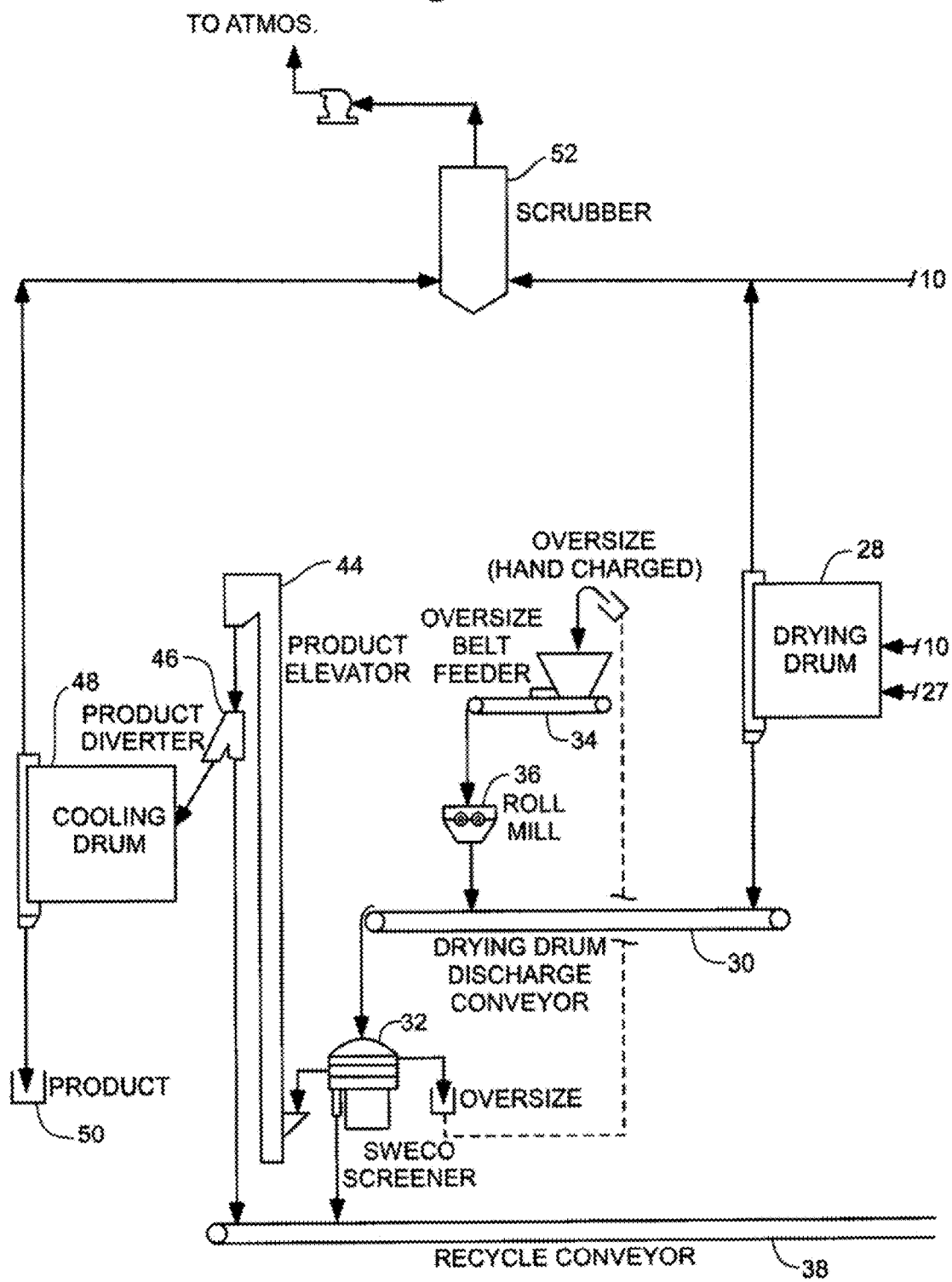

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Biologicals, such as, but not limited to, biological chemicals, plant and other extracts, microbial agents, and/or other living organisms, such as, for example, endophytes, fungi, yeasts, and bacteria, can be added to dry fertilizers to improve plant health and overall crop yield. The biologicals are added to fertilizer in the form of an emulsion, so that the biological can be suspended in water without undesirably increasing the moisture content of the fertilizer beyond a critical relative humidity at which the fertilizer is more likely to cake. Use of fertilizers containing such biologicals can be sufficient to render stressed areas more profitable.

Figures 1, 2:
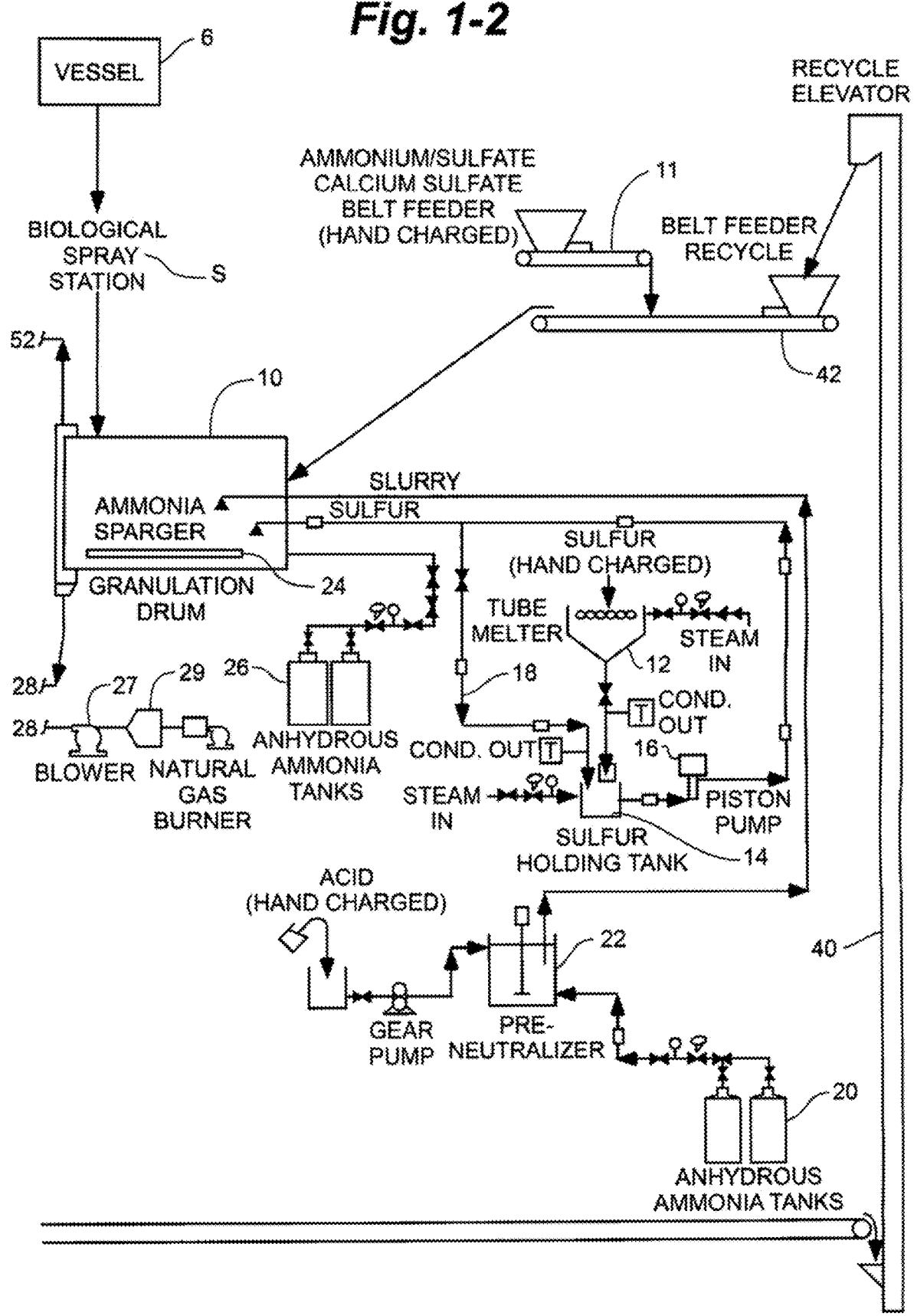
Figure 2:
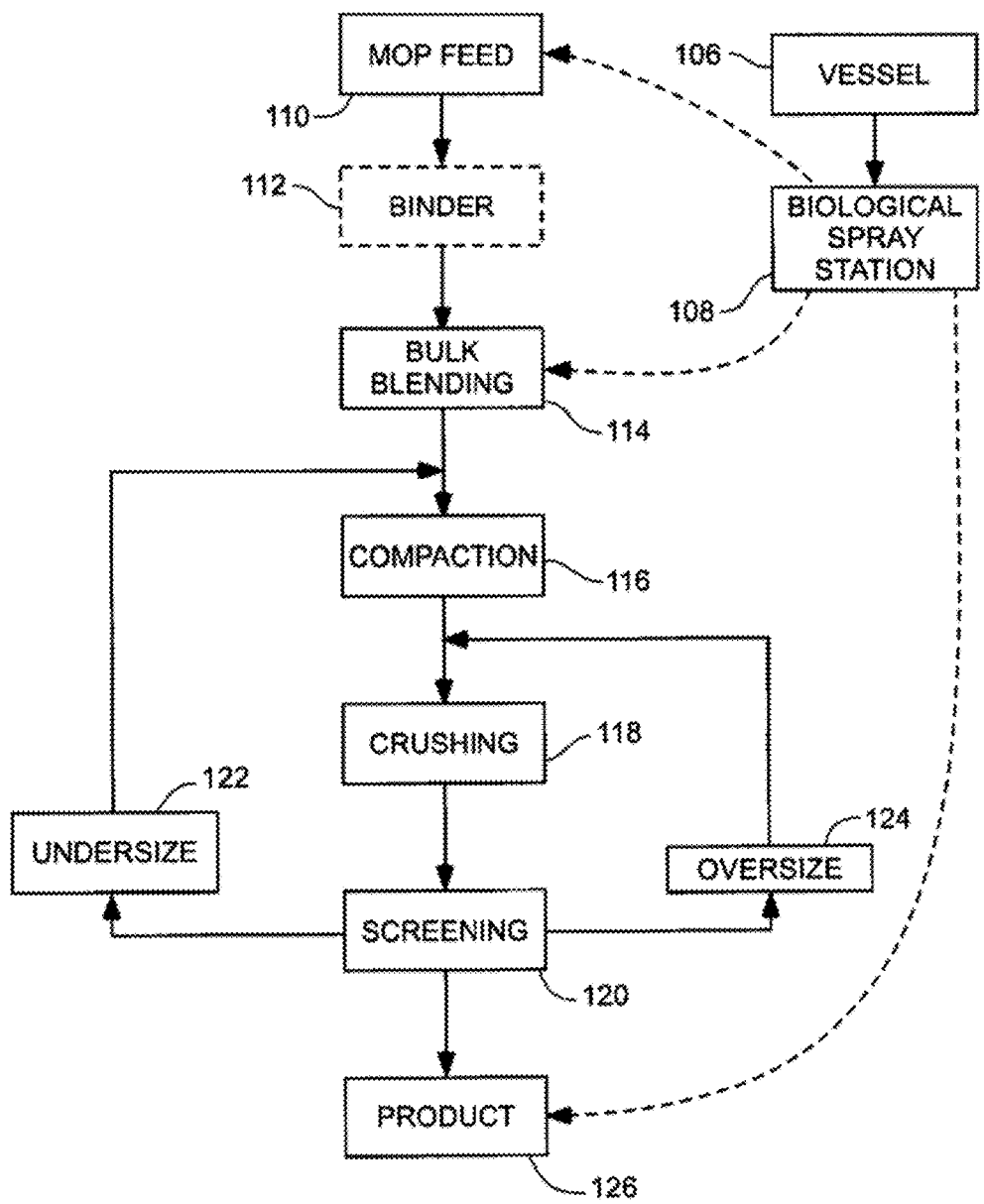
Figure 3:
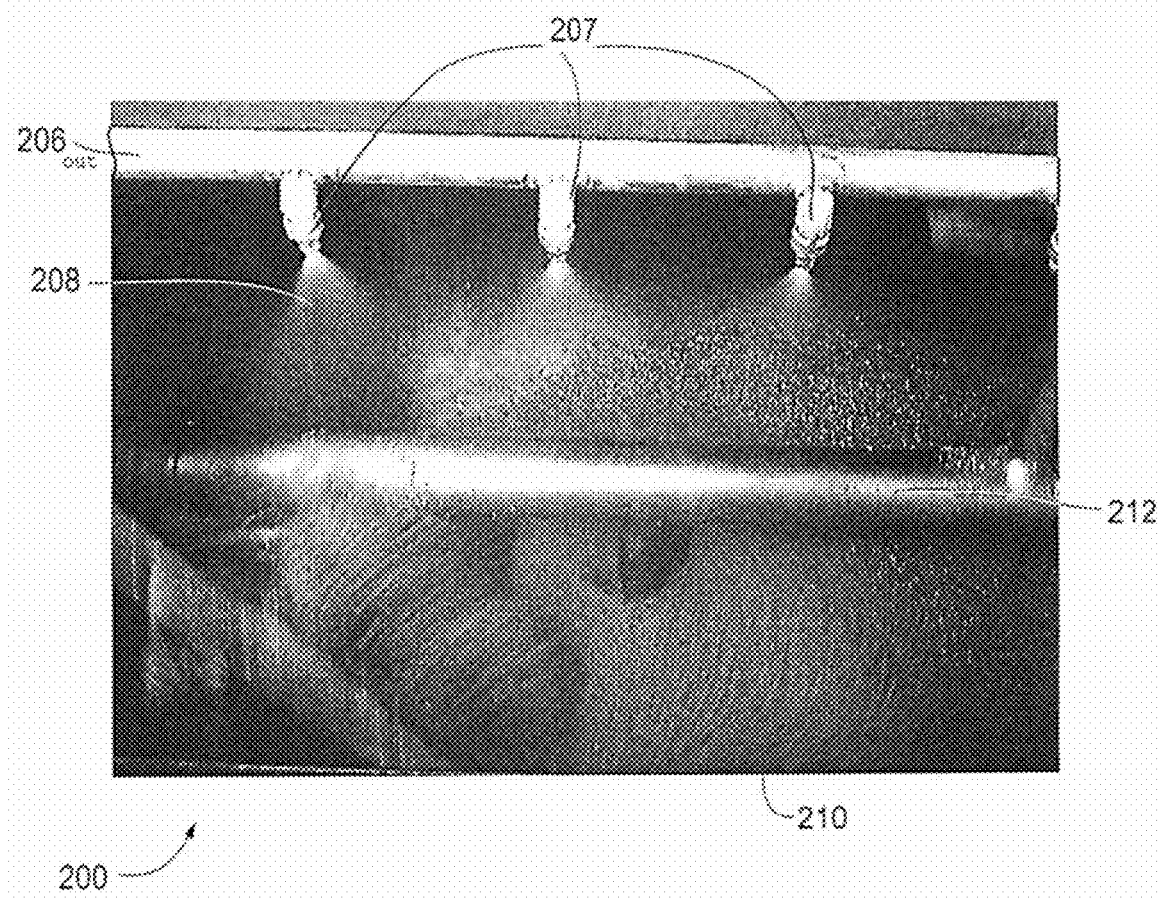
FIG. 3 is a perspective view of a spraying system configured to apply a solution including biologicals to a dry fertilizer, according to an embodiment.
Figure 4:
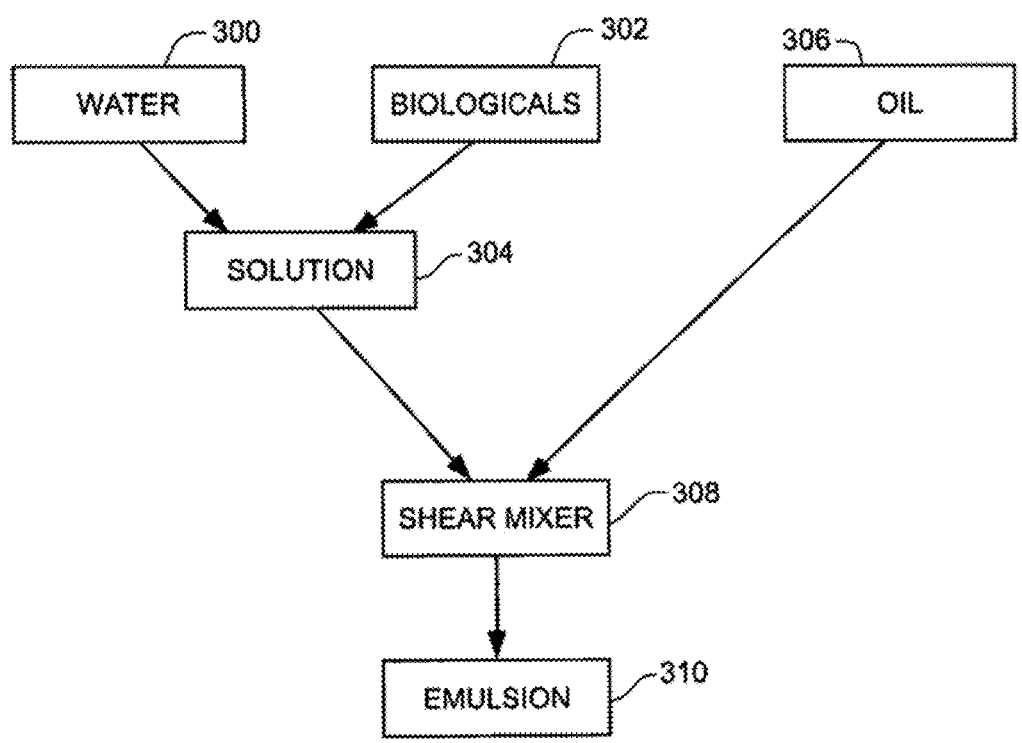
FIG. 4 is a schematic illustration of a process for manufacturing a biological containing emulsion, according to an embodiment.

FIGS. 1, 1-1, and 1-2 are a schematic illustrating a non-limiting embodiment of a system that uses a process known as granulation to produce dry phosphate fertilizers. In one non-limiting embodiment, the fertilizer granules are formed using the granulation methods described in U.S. Pat. No. 6,544,313 ("313 'patent") entitled "Sulfur-Containing Fertilizer Composition and Method for Preparing Same," incorporated herein by reference in its entirety. In another non-limiting embodiment, the fertilizer granules are formed using the granulation methods described in U.S. Pat. No. 7,497,891 entitled "Method For Producing A Fertilizer With Micronutrients," incorporated herein by reference in its entirety.

The granulation system illustrated in FIGS. 1, 1-1, and 1-2 is similar to the granulation process shown in FIG. 1 of the '313 patent, and also includes vessel 6 and spray or sparger 8. Vessel 6 is a device or vessel for generating a biological coating material comprising a solution, dispersion, or emulsion containing biologicals. For example, one or more biologicals, in various non-limiting embodiments and combinations as described throughout, can be dissolved or dispersed in oils, in water, in emulsions thereof, or any other suitable carrier medium in vessel 6.

As discussed above, examples of biologicals include one or more species from a bacterial genus such as, but not limited to, *Bacillus, Rhizobium, Azobacter*, and *Azospirillum*, one or more species from a fungal genus or fungi such as *Aspergillus, Mycorhizzae, Beauveria, Metarhizium*, and *Trichoderma*, and/or one or more species from a yeast genus such as *Saccharomyces, Schizosaccharomyces, Sporobolomyces, Candida, Trichosporon*, and *Rhodosporidium*. Other biologicals are not microorganisms, but rather can be small molecule and peptide-based compositions such as metabolites, peptides, lipopeptides, hormones, peptide hormones, siderophores, glycopeptides, humates, surfactants, vitamins, enzymes, amino acids and amino acid derivatives, and nucleic acids and nucleic acid derivatives. Optionally, in addition to the biological agent, antimicrobial agents, pesticides, insecticides, fungicides, surfactants, emulsifiers, pigments, dyes, and/or other additives can be combined with the biological agent(s) in a biological composition. Non-limiting examples of compositions containing biological agents and other additives can be found in U.S. Patent Application Publication Nos. 2015/0148228 (entitled "Composition Comprising a Biological Control Agent and a Fungicide"); 2015/0141246 (entitled "Compositions Comprising a Biological Control Agent and an Insecticide"); 2015/0141245 (entitled "Compositions Comprising a Biological Control Agent and a Fungicide from the Group Consisting of Inhibitors of the Respiratory Chain at Complex I or II); and 2015/0141244 (entitled "Compositions Comprising a Biological Control Agent and an Insecticide"), all of which are herein incorporated by reference in their entireties.

One or more of these biologicals (or others and/or other additives) can be dissolved into or suspended in the carrier medium in vessel 6. In embodiments, vessel 6 can be a shear mixer, emulsifier, roller, or shaker/agitator, for example.

In an embodiment, the biological coating solution or dispersion that is formed in vessel 6 is sprayable via spray station 8. Biological spray station 8 can be used to sparge/spray the solution onto dry fertilizer. Biological spray station 8 can be positioned within or proximate dry fertilizer at granulation drum 10, according to the embodiment shown in FIGS. 1, 1-1, and 1-2. In various alternative embodiments, the biological coating solution could be applied to dry fertilizer at other stages of the production of fertilizer and/or via other means such as curtain coating, drum coating, or the like. For example, the biological coating solution could be applied to the fertilizer after the granulation process is complete (i.e., to product 50). Alternatively, the biological coating solution could be applied to any of the inputs to granulation drum 10, including the slurry from preneutralizer 22, the sulfur from piston pump 16, or the sulfates from belt feeder 11. In some cases, biologicals included in embodiments can be applied at temperatures ranging from about 70° F. to about 210° F., or more particularly, from about 70° F. to about 180° F., or more particularly, from about 70° F. to about 160° F.

In one embodiment, the system includes one or more spray stations 8 for application of a biological solution in combination with one or more other additives. For example, spray stations 8 can be used to apply a de-dust oil to fertilizer granules in addition to a solution containing biological, either sequentially or simultaneously. Alternatively, as discussed above, the solution can comprises an aqueous based solution, an oil-based solution, or an emulsion, such as an emulsion of water-encapsulated biologicals emulsified with an oil.

Biologicals applied accordingly have the potential to enhance the growth and development of plants as well as function as a bio-pesticide to treat plant pests, such as, for example, plant diseases. Application rates of the liquid-biological mixture can be in the range of 1-10 L/dry ton of fertilizer, for example. In some embodiments, the biological-inoculated composition can be applied to dry fertilizer in the range of 2-3 L/dry ton of fertilizer. After application, fertilizers can possess various densities of CFUs. In one embodiment, fertilizers can be sprayed with biological spray station 8 until they have a biological concentration of $10^6$ CFU/g or more.

Once the fertilizer has been treated with biologicals, it can be applied to soil via broadcasting, banding or other potential means. The fertilizer acts as the delivery method for introducing biologicals to the soil. Once in the soil, the biological targets the plant rhizosphere and reduces the plant stress in one or more of several ways such as in the following descriptions. For example, biologicals can compete with pathogens for nutrients at the root surface. Further, biologicals can produce toxins that inhibit growth and reproduction of pathogens. Biologicals can produce stimulatory compounds absorbed by the roots of plants, and can also parasitize fungal pathogens, insects, or nematodes.

FIG. 2 is a schematic illustrating a system that uses a process known as compaction to produce dry potash fertilizers. Similarly to the granulation process shown in FIGS. 1, 1-1, and 1-2, biologicals may be added at various points in a compaction process. As such, potash fertilizer can act as a carrier for the biologicals that are added in an emulsion.

One example of potash fertilizer manufacturing process shown in FIG. 2 includes the steps of providing a raw fertilizer material feed, shown here as muriate of potash (MOP) feed 110 for exemplary purposes only. One of ordinary skill in the art would recognize that other potash sources can also be contemplated. Optionally, a binder can be added at step 112. The fertilizer is blended in bulk at step 114. Steps 116-124 are a loop for properly sizing the finished fertilizer pellets. At step 116, compaction takes place, and at step 118 the compacted MOP (and any additives) are crushed. At step 120, the crushed MOP is screened for size. Undersized MOP pellets are returned, via step 122, to be re-compacted. Oversized MOP pellets are returned, via step 124, to be re-crushed. Those pellets that fit within some desired size parameters exit the sizing loop and make up the final product, at step 126.

In the embodiment shown in FIG. 2, and similar to the process of FIGS. 1, 1-1, and 1-2, a biological coating solution is formed in vessel 106, that is then applied via the biological application or spray station 108, which can be applied to a potash fertilizer at any of several steps in the process of making the fertilizer. Vessel 106 and biological spray station 108 are substantially similar to vessel 6 and biological spray station 8 of FIGS. 1, 1-1, and 1-2, respectively. The biological coating solution can be applied to the MOP fertilizer pellets at one or more steps, as shown. For example, the biological coating solution can be sparged onto the MOP feed at step 110. Alternatively, the biological coating solution can be added at the bulk blending 114 step. Additionally or alternatively, the biological coating solution can be added to the product 126.

FIG. 3 is a perspective view of a mixing system 200 by which the biologicals described with respect to FIGS. 1 and 2 can be added to dry fertilizer, according to an embodiment.

Mixing system 200 includes pipe $\mathbf{206}_{out}$, which is the outlet of a vessel. Pipe $\mathbf{206}_{out}$ is connected to sprayers 207. Sprayers 207 deliver biological coating solution 208 which can comprise, as discussed above, an aqueous-based solution or dispersion, an oil-based solution or dispersion, or an emulsion of oil or water and biological-laden water (e.g. inoculated water-in-oil or -in-water, or inoculated water-in-oil-in-water), onto fertilizer 210. While sprayers 207 are spraying biological spray 208, mixer 212 agitates fertilizer 210, to promote even distribution of biological coating solution 208 onto the pellets of fertilizer 210.

FIG. 4 is a flow chart depicting an emulsion process, according to one non-limiting embodiment. Water 300 and biologicals 302 (and optional other additives not shown) are combined into solution or suspension 304. Solution 304 is combined with oil 306 in a shear mixer 308 to form emulsion 310. In some embodiments, shear mixer 308 generates emulsion 310 that contains pockets of solution 304, such that biologicals 302 are dispersed only in water 300. This facilitates the use of biologicals 302 that are more stable in water 300 than oil 306, as well as allowing subsequent coating of fertilizer in such a way that the relative humidity or moisture content of the fertilizer is not substantially increased. This can be important because significant increase in the water content of fertilizers can cause clumping or sintering.

In some embodiments, oil 306 can be a dedusting oil, such as those described in WIPO Publication No. WO 2015/026806, entitled SYSTEM AND METHODS FOR ADDITION OF BENEFICIAL AGRICULTURAL, BIOLOGICAL, AND/OR DEDUSTING ADDITIVES TO GRANULAR FERTILIZERS, incorporated herein by reference in its entirety, and/or can comprise oil having the trade name Dustrol, Dustrol Plus, VM160, N100, N150, N300 etc., mineral oils, vegetable oils, optionally inoculated with biologicals.

In embodiments, the biological-inoculated liquid or aqueous portion of the emulsion can have a biological concentration equal to or greater than $10^9$ CFU/g. For example, the biologicals 302 are present in the emulsion 310 at a final concentration of about $10^3$ to about $10^{12}$ CFU (colony forming units)/g, and more particularly about $10^6$ to about $10^9$ CFU/g. The coating is then added to the fertilizer, such as, for example 4.1 mls of an aqueous solution comprising biologicals can be added to every 1 lb of fertilizer, or alternatively, about $10^{12}$ to about $10^{15}$ CFU/L can be added to liquid fertilizer to achieve the above final target concentration.

According to this embodiment, water 300 is inoculated with biologicals 302. Optional other additives, such as those described above, can also be dispersed within water 300. An oil, such as mineral oil, load-out oil, and/or another oil source, is obtained and used as oil 306 such that the inoculated water solution 304 is mixed with the oil 306 using a high-shear mixer or blender to create water particles or pockets (containing biological and optional other additives) inside the oil. In an embodiment, the water particles can comprise 30-80% of the total emulsion. In this way, the critical relative humidity of the fertilizer is no changed or increased, thereby reducing the probability of caking. Because inoculating oils 306 with biologicals 302 directly can hinder the viability of the biological, suspending the biological in water in an oil-in water or water-in-oil emulsion can provide increased stability and/or efficacy. As such, it is often desirable to use water to protect the health of the biological 302, but reduce the volume of water 300 on the fertilizer that is subsequently coated by emulsion 310 by suspending the biological-laden water solution 304 in oil.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

What is claimed is:

1. A fertilizer product comprising:
a plurality of fertilizer granules; and
a biological coating applied to each of the fertilizer granules, the biological coating comprising a water-in-oil emulsion of an oil and a suspension comprising water and a biological agent such that the biological coating comprises a plurality of water particles containing the biological agent suspended within the oil,
wherein the biological agent is a living organism, and
wherein the water particles provide a water content of 30%-80% of the emulsion.

2. The fertilizer product of claim 1, wherein the living organism is a bacteria selected from the group consisting of *Bacillus, Rhizobium, Azobacter, Azospirillum*, and combinations thereof.

3. The fertilizer product of claim 2, wherein the living organism comprises one or more species from the genus *Bacillus*.

4. The fertilizer product fertilizer of claim 1, wherein the biological agent is a fungus selected from the group consisting of *Aspergillus, Mycorhizzae, Beauveria, Metarhizium, Trichoderma, Saccharomyces, Schizosaccharomyces, Sporobolomyces, Candida, Trichosporon, Rhodosporidium*, and combinations thereof.

5. The fertilizer product of claim 1, wherein the biological agent is applied to the fertilizer granule such that a final concentration of biological agent is of about $10^3$ to about $10^{12}$ CFU/g.

6. The fertilizer product of claim 1, wherein the fertilizer granule comprises a phosphate material.

7. The fertilizer product of claim 1, wherein the fertilizer granule comprises potash material.

8. A fertilizer product comprising:
a plurality of fertilizer granules; and
a biological coating applied to each of the fertilizer granules, the biological coating comprising a water-in-oil emulsion of an oil and a suspension comprising water and a biological agent such that the biological coating comprises a plurality of water particles containing the biological agent suspended within the oil,
wherein the biological agent is a bacteria selected from the group consisting of *Bacillus, Rhizobium, Azobacter, Azospirillum*, and combinations thereof, and wherein the water particles provide a water content of 30%-80% of the emulsion.

9. The fertilizer product of claim 8, wherein the biological agent is applied to the fertilizer granule such that a final concentration of biological agent is of about $10^3$ to about $10^{12}$ CFU/g.

10. The fertilizer product of claim 8, wherein the fertilizer granule comprises a phosphate material.

11. The fertilizer product of claim 8, wherein the fertilizer granule comprises a potash material.

12. The fertilizer product of claim 8, wherein the bacteria comprise one or more species from the genus *Bacillus*.

13. A fertilizer product comprising:
a plurality of fertilizer granules; and
a biological coating applied to each of the fertilizer granules, the biological coating comprising a water-in-oil emulsion of an oil and a suspension comprising water and a biological agent such that the biological coating comprises a plurality of water particles containing the biological agent suspended within the oil,
wherein the biological agent is a fungus selected from the group consisting of *Aspergillus, Mycorhizzae, Beauveria, Metarhizium*, and *Trichoderma, Saccharomyces, Schizosaccharomyces, Sporobolomyces, Candida, Trichosporon, Rhodosporidium*, and combinations thereof, and wherein the water particles provide a water content of 30%-80% of the emulsion.

14. The fertilizer product of claim 13, wherein the biological agent is applied to the fertilizer granule such that a final concentration of biological agent is of about $10^3$ to about $10^{12}$ CFU/g.

15. The fertilizer product of claim 13, wherein the fertilizer granule comprises a phosphate material.

16. The fertilizer product of claim 13, wherein the fertilizer granule comprises a potash material.

* * * * *